United States Patent [19]

Dannatt

[11] 4,427,284
[45] Jan. 24, 1984

[54] ADJUSTMENT MEANS FOR FIBER OPTIC ILLUMINATOR

[75] Inventor: Hugh S. L. Dannatt, Bethel, Conn.

[73] Assignee: Pitney Bowes Inc., Stamford, Conn.

[21] Appl. No.: 384,820

[22] Filed: Jun. 3, 1982

[51] Int. Cl.³ .............................................. G03B 27/00
[52] U.S. Cl. ...................................... 355/1; 350/96.18
[58] Field of Search ........................... 355/1; 350/96.18

[56] References Cited

U.S. PATENT DOCUMENTS 4,190,347 2/1980 Siegmund ................................ 355/1

*Primary Examiner*—Monroe H. Hayes
*Attorney, Agent, or Firm*—Lawrence E. Sklar; William D. Soltow, Jr.; Albert W. Scribner

[57] ABSTRACT

An improvement in a fiber optic illuminating system having a linear array of fiber ends and a platen for supporting an original document to be scanned and copied. The improvement includes a flexible lens assembly situated intermediate the array of fiber ends and the platen, a deflectable frame supporting the flexible lens assembly, and a device for deflecting the deflectable frame, whereby the flexible lens assembly can be transversely deflected to thereby modify the linearity of the lens assembly without disturbing the focal adjustment thereof.

4 Claims, 3 Drawing Figures

ADJUSTMENT MEANS FOR FIBER OPTIC ILLUMINATOR

BACKGROUND OF THE INVENTION

The instant invention relates to illuminating means used in electrophotocopying machines and the like, and more particularly to those illuminating systems in which the processed optical image takes the form of a line scan.

One such line scan illuminating system scans an original document to be copied and projects a narrow band of light upon the active surface of an electronic charge coupled device (CCD). The linear form of the receptor surface is exceedingly narrow (typically 13 microns), and consequently the illuminated area of the original document must be illuminated correctly to overlay the active area of the CCD.

The fiber optic illuminator enjoys merits as applied to scanning machines such as those based on CCD electronics, the primary reason being that it is possible to project a narrow, high intensity swath of light derived from a relatively low wattage light source. The light pipe property of the fibers permits the fibers to be grouped at one end to form a disc in the proximity of a light source and the other end to be constrained to form a line equal or slightly exceeding the width of the original document to be copied.

In order to have an efficient fiber optic illuminator, there needs to be incorporated between the linear array of fiber ends and the original document being copied a lens element. The need for a lens element arises because the rays emitted from the fiber ends are divergent and a cylinder lens or condenser must be added to cause these rays to converge upon the plane of the original document being copied, thereby forming the intense swath of light.

A suitable lens for a fiber optic illuminator is one of the Fresnel types, which are fabricated from plastic and formed into a thin strip on which has been formed a series of prism-shaped projections extending lengthwise and parallel to the linear array of the fiber optic illuminator. One such Fresnel lens is manufactured by the Visual Products Division of the 3M Corporation and marketed under the name "3M Lensfilm".

A Fresnel lens mounted parallel to the fiber optic illuminator and located intermediate the illuminator and the document to be copied, and spaced from both, serves as a light concentrator. In such arrangements, there is a need to be able to modify the linearity of the swath of light emitted from the illuminator without disturbing the focal adjustment of the system. The instant invention therefore provides a means of modifying the linearity of the swath of light emitted from the illuminator without disturbing the focal adjustment thereof.

SUMMARY OF THE INVENTION

The instant invention provides an improvement in a fiber optic illuminating system having a linear array of fiber ends and a platen for supporting an original document to be scanned and copied. The improvement comprises a flexible lens assembly situated intermediate the array of fiber ends and the platen, a deflectable frame supporting the flexible lens assembly, and means for deflecting the deflectable frame whereby the flexible lens assembly can be transversely deflected without disturbing the focal adjustment thereof.

DETAILED DESCRIPTION

Figure 1:
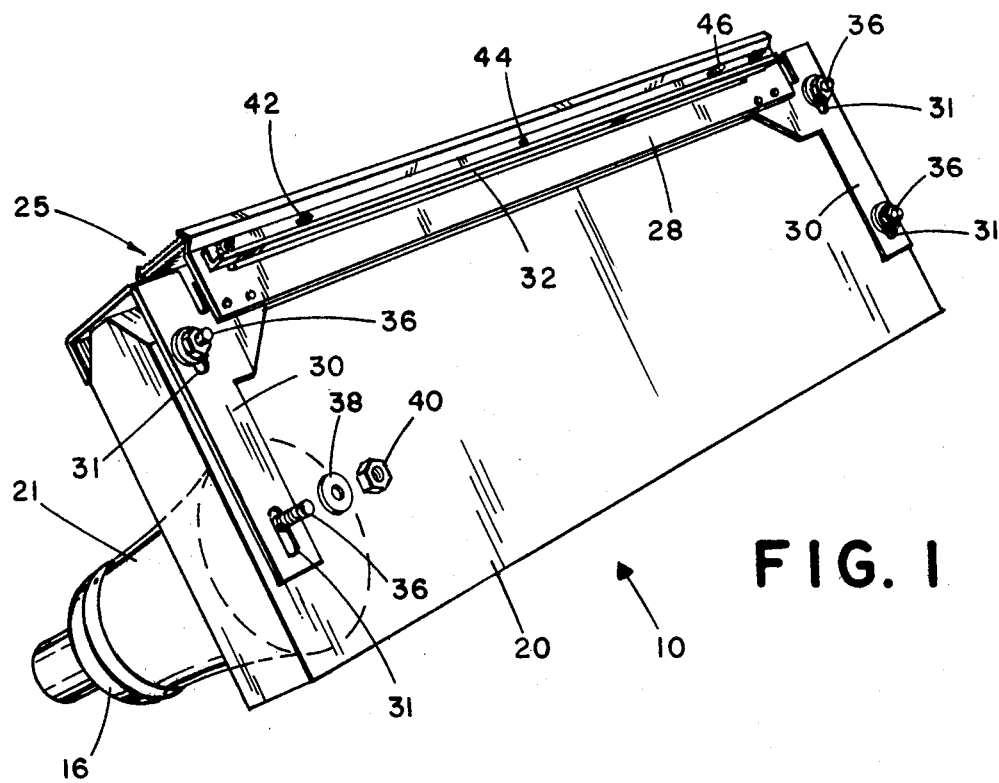
FIG. 1 is a perspective view of a fiber optic illuminator and lens assembly according to the instant invention.
Figure 2:
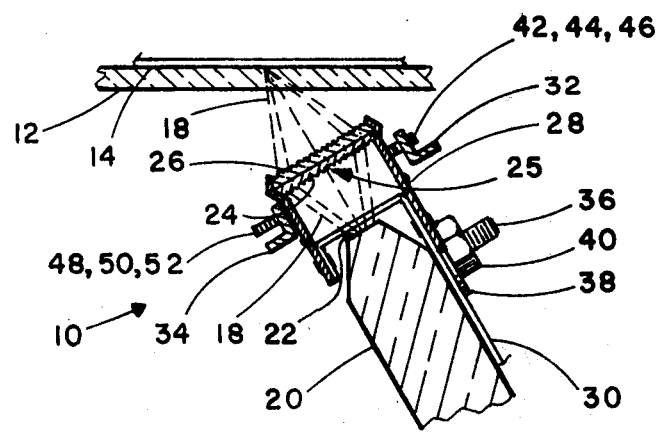
FIG. 2 is a central, vertical, sectional view of the fiber optic illuminator and lens assembly shown in FIG. 1 together with the supporting platen for the document being scanned and copied.
Figure 3:
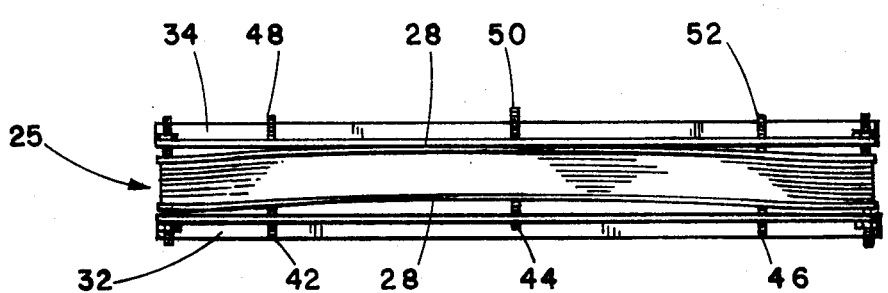
FIG. 3 is a top, plan view of the lens assembly shown in FIGS. 1 and 2.

In describing the preferred embodiment of the instant invention, reference is made to the drawings wherein there is seen in FIGS. 1 and 2 an optical scanning system generally designated 10 including a glass platen 12 (see FIG. 2) for supporting an original document 14 to be scanned and copied. The original document 14 is illuminated by means of a lamp 16 which provides a bundle of light rays directed toward the input end (21) of an array of illuminating fibers (not shown) housed in a fiber optic illuminator assembly 20. The input end 21 of the illuminating fibers comprises essentially a circular form which becomes at the output end 22 of the fiber optic illuminator assembly 20 a line consisting typically of one or two rows of fibers which direct a line of light rays 18 toward the original document 14 being scanned and copied. The line of light rays 18 encounters a Fresnel lens array 25 consisting of a pair of cylinder Fresnel lenses 24 and 26 and then is reflected off the original document 14 onto a set of mirrors (not shown) and then into a lens cell (not shown) from which it is focused onto a CCD module (not shown).

As best seen in FIG. 2, the Fresnel lens assembly 25 consists of two contiguous strips of plastic lens 24 and 26 which have the effect of reducing the focal distance by a factor of two, thereby securing an extremely compact configuration. The cylinder Fresnel lens assembly 25 is mounted on a deflectable support frame 28 which in turn is fixed to a bracket arm 30 which is furnished with slots 31 to facilitate focal adjustment. A pair of L-shaped deflector channels 32 and 34 are secured by conventional manner to the bracket arm 30, which is secured to the fiber optic illuminator assembly 20 by studs 36, washers 38 and nuts 40.

The L-shaped deflector channel 32 receives set screws 42, 44 and 46 while the L-shaped deflector channel 34 receives set screws 48, 50 and 52 axially opposed to those in the channel 32. It follows that by adjustment of the set screws 42, 44, 46, 48, 50 and 52 an optimum swath of original document illumination may be established without disturbing the focal adjustment by deflecting the Fresnel lens assembly 25 transversely.

Final adjustment of the fiber optic illuminator assembly 20 may be best executed in its assembled machine. It is preferred to back project from the CCD area, where a mask is substituted for the electronic device, an image of the CCD active area upon a sheet of ground glass or plastic positioned as a substitute for an original document. If the ground medium be suitably scribed, the exact area of illumination may be established and it follows that a comparison may be made if the illumination system is activated. By the foregoing means, it will readily be understood that the exact illumination requirements may be determined, which include possible corrections for lens and mirror aberrations.

Although the preferred embodiment of the instant invention has been described in terms of a cylinder Fresnel lens, it should be understood that the instant invention may be used with any flexible lens, including cylinder lenses and virtually any plastic lenses. Furthermore, although the deflection means described in the preferred embodiment takes the form of axially opposed screws, the substitution of suitably positioned, deformable tabs or projections should be recognized as within the scope of the invention.

Numerous alterations of the structure herein disclosed will suggest themselves to those skilled in the art. However, it is to be understood that the description relates to a preferred embodiment of the invention which is for purposes of illustration only and is not to be construed as a limitation of the invention. All such modifications which do not depart from the spirit of the invention are intended to be included within the scope of the appended claims.

What is claimed is:

1. In a fiber optic illuminating system having a linear array of fiber ends and a platen for supporting an original document to be scanned and copied, the improvement comprising:
   a flexible lens assembly situated intermediate said array of fiber ends and said platen;
   a deflectable frame supporting said flexible lens assembly; and
   means for deflecting said deflectable frame whereby said flexible lens assembly can be transversely deflected to thereof modify the linearity of said lens assembly without disturbing the focal adjustment thereof.

2. The improvement of claim 1, additionally comprising a bracket arm, and a pair of deflector channels screwed to said bracket arm.

3. The improvement of claim 2, wherein said deflecting means comprises a plurality of set screws threadingly engaging said deflector channels.

4. The improvement of claim 3, wherein said deflector channels are L-shaped.

* * * * *